US011990661B2

(12) United States Patent
Yuan et al.

(10) Patent No.: US 11,990,661 B2
(45) Date of Patent: May 21, 2024

(54) TM MODE FILTER AND METHOD FOR MANUFACTURING TM MODE FILTER

(71) Applicant: HUAWEI TECHNOLOGIES CO., LTD., Guangdong (CN)

(72) Inventors: Bengui Yuan, Shanghai (CN); Puke Zhou, Shanghai (CN); Jinyan Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 17/360,679

(22) Filed: Jun. 28, 2021

(65) Prior Publication Data

US 2021/0328316 A1 Oct. 21, 2021

Related U.S. Application Data

(63) Continuation of application No. PCT/CN2018/124755, filed on Dec. 28, 2018.

(51) Int. Cl.

| | |
|---|---|
| ***H01P 7/10*** | (2006.01) |
| ***H01P 1/20*** | (2006.01) |
| ***H01P 1/201*** | (2006.01) |
| ***H01P 1/208*** | (2006.01) |
| ***H01P 11/00*** | (2006.01) |

(52) U.S. Cl.

CPC .......... *H01P 1/2086* (2013.01); *H01P 1/2002* (2013.01); *H01P 1/201* (2013.01); *H01P 1/2084* (2013.01); *H01P 7/10* (2013.01); *H01P 11/007* (2013.01)

(58) Field of Classification Search

CPC .... H01P 7/10; H01P 7/105; H01P 7/00; H01P 1/20; H01P 1/201; H01P 1/207; H01P 1/208; H01P 1/2082; H01P 1/2084; H01P 1/2086

See application file for complete search history.

(56) References Cited

U.S. PATENT DOCUMENTS

| | | | | |
|---|---|---|---|---|
| 4,862,111 A * | 8/1989 | Mettoudi | ............. | H03B 5/1876 331/117 D |
| 7,106,152 B2 | 9/2006 | Yamakawa et al. | | |
| 2012/0326811 A1 | 12/2012 | Resnati et al. | | |

FOREIGN PATENT DOCUMENTS

| | | |
|---|---|---|
| CN | 201725860 U | 1/2011 |
| CN | 102136620 A | 7/2011 |
| CN | 102222811 A | 10/2011 |

(Continued)

OTHER PUBLICATIONS

CN103972618A translation having paragraph numbers; 2014 (Year: 2014).*

(Continued)

*Primary Examiner* — Stephen E. Jones
(74) *Attorney, Agent, or Firm* — Fish & Richardson P.C.

(57) ABSTRACT

The present disclosure relates to transverse magnetic wave (TM) mode filters and methods for manufacturing a TM mode filter. One example TM mode filter includes a filter body, a dielectric, and a transition layer, the filter body including a filter cavity and a cover, and having hollow confined space, the dielectric located in the hollow confined space, and the transition layer configured to connect the dielectric and the filter body. A coefficient of thermal expansion (CTE) of the transition layer is between a CTE of the filter body and a CTE of the dielectric.

20 Claims, 6 Drawing Sheets

(56) References Cited

FOREIGN PATENT DOCUMENTS

| | | | |
|---|---|---|---|
| CN | 202363563 | U | 8/2012 |
| CN | 203521565 | U | 4/2014 |
| CN | 103972618 | A | 8/2014 |
| CN | 204205010 | U | 3/2015 |
| CN | 204464424 | U | 7/2015 |
| CN | 107425241 | A | 12/2017 |
| CN | 207134456 | U | 3/2018 |
| EP | 2538487 | A1 | 12/2012 |
| IN | 108631030 | A | 10/2018 |
| JP | H084206 | A | 1/1996 |
| JP | H1084206 | A | 3/1998 |
| JP | 2000216602 | A | 8/2000 |
| WO | 2009093636 | A1 | 7/2009 |
| WO | 2010013982 | A2 | 2/2010 |
| WO | 2016183818 | A1 | 11/2016 |

OTHER PUBLICATIONS

PCT International Search Report and Written Opinion issued in International Application No. PCT/CN2018/124755 dated Sep. 19, 2019, 20 pages (with English translation).
Office Action in Japanese Appln. No. 2021-537970, dated Apr. 11, 2023, 5 pages (with English translation) .
Extended European Search Report issued in European Application No. 18944865.7 dated Nov. 18, 2021, 13 pages.
Office Action in Chinese Application No. 201880100498.5, dated Sep. 27, 2021, 8 pages.
Office Action issued in Japanese Application No. 2021-537970 dated Sep. 6, 2022, 12 pages (with English translation).
Office Action issued in Chinese Application No. 201880100498.5 dated Mar. 18, 2022, 7 pages.

* cited by examiner

TM MODE FILTER AND METHOD FOR MANUFACTURING TM MODE FILTER

CROSS-REFERENCE TO RELATED APPLICATIONS

This application is a continuation of International Application No. PCT/CN2018/124755, filed on Dec. 28, 2018, the disclosure of which is hereby incorporated by reference in its entirety.

TECHNICAL FIELD

This application relates to the filter field, and in particular, to a transverse magnetic wave (transverse magnetic wave, TM) mode filter and a method for manufacturing a TM mode filter.

BACKGROUND

With increasing development of wireless communications technologies, wireless spectrums become more congested. As a front-end frequency selection apparatus, a filter is widely applied to the communications field. The filter may be used to select a useful signal, to protect a system from spurious interference or blocking interference caused by a spatial pollution signal. In addition, the filter may also ensure that a signal transmitted by a self-owned system does not interfere with another neighboring intersystem.

With continuous iterative evolution of radio frequency technologies, a conventional metal cavity filter cannot fully meet a requirement for miniaturization of a filter, a low insertion loss, and low costs. More researches show that taking factors such as performance and costs into consideration, a TM resonance mode is an optimal cavity solution. Therefore, a TM mode filter becomes a filter frequently used in a communication system.

In the TM mode filter, technical specifications such as a loss, passive inter-modulation (passive intermodulation, PIM), and long-term reliability of the filter can be ensured only when a dielectric and a cavity are fully and securely in good contact. However, due to impact of a factor such as thermal expansion of an object, it is difficult to achieve good contact between the dielectric and the cavity in an existing common mounting manner.

Therefore, how to achieve good contact between the dielectric and the cavity in the TM mode filter becomes an urgent problem to be resolved.

SUMMARY

This application provides a TM mode filter and a method for manufacturing a TM mode filter, to achieve good contact between a dielectric and a cavity.

According to a first aspect, a TM mode filter is provided. The TM mode filter includes: a filter body, including a filter cavity and a cover, and having hollow confined space; a dielectric, located in the hollow confined space; and a transition layer, configured to connect the dielectric and the filter body. A coefficient of thermal expansion CTE of the transition layer is between a CTE of the filter body and a CTE of the dielectric.

Because the CTE of the transition layer is between the CTE of the filter body and the CTE of the dielectric in this embodiment of this application, a problem of a CTE mismatch can be resolved, and good contact between the dielectric and the filter can be achieved in this embodiment of this application.

With reference to the first aspect, in an implementation of the first aspect, a first metal layer is disposed on an end face that is of the dielectric and that is in contact with the transition layer, and the first metal layer is configured to connect the dielectric and the transition layer.

For example, the first metal layer is silver, copper, gold, or the like. This is not limited in this embodiment of this application.

In this embodiment of this application, the first metal layer is disposed on a dielectric ceramic pillar. For example, the dielectric is plated with the first metal layer through a sintering process. Because of the first metal layer, the dielectric and the transition layer can be securely and effectively welded together, to further securely and effectively connect the dielectric and the filter body.

In this embodiment of this application, only one of an upper end face and a lower end face of the dielectric may be in contact with the filter body (in other words, the one end face is short-circuited with the filter body). Optionally, in this embodiment of this application, both the upper end face and the lower end face of the dielectric may be in contact with the filter body (in other words, the two end faces are short-circuited with the filter body).

When both the upper end face and the lower end face of the dielectric are in contact (short-circuited) with the filter body, the TM mode filter works in a TM110 resonance mode.

When one end face of the dielectric is in contact with the filter body, for example, when the lower end face of the dielectric is in contact (short-circuited) with the cavity, and the upper end face of the dielectric is open-circuited with the cover, or when the lower end face of the dielectric is open-circuited with the cavity, and the upper end face is short-circuited with the cover, the TM mode filter works in a TM116 resonance mode.

A filter in the TM110 resonance mode has characteristics of a low frequency and a small size, and performance of the filter is worse than performance of a filter in the TM116 resonance mode. Correspondingly, the filter in the TM116 resonance mode has characteristics of a larger size, a higher operating frequency, and better performance.

In this embodiment of this application, it may be determined, based on an actual situation, that one or both ends of the dielectric in the TM mode filter are in contact with the filter body. This is not limited in this embodiment of this application.

With reference to the first aspect, in an implementation of the first aspect, the transition layer is configured to connect the dielectric and the bottom of the filter cavity.

With reference to the first aspect, in an implementation of the first aspect, a first step-shaped protrusion structure is disposed at the bottom of the cavity body, and the first step-shaped protrusion structure includes a first protrusion that is in contact with the bottom of the filter cavity and a second protrusion that is located on the first protrusion;

the bottom that is of the dielectric and that is near an inner side wall and the first protrusion have a first overlapping area, and the dielectric overlaps the first protrusion in the first overlapping area, so that a first gap is formed between the bottom of the dielectric and the bottom of the filter cavity; and the transition layer fills the first gap, and an outer diameter of the transition layer is greater than an outer diameter of the dielectric.

In this embodiment of this application, a height of the first protrusion is set to adjust a thickness of the transition layer, so that the transition layer has an appropriate thickness.

In addition, in this embodiment of this application, the outer diameter of the transition layer is greater than the outer diameter of the dielectric, so that the transition layer is smoother, and it can be ensured that a loss of a current flowing through the transition layer is reduced. In addition, the outer diameter of the transition layer is slightly greater than the outer diameter of the dielectric, to ensure that the transition layer (which may also be referred to as a solder joint) can completely wrap an end face between the dielectric resonator and the cavity, thereby avoiding a capacitance effect introduced by a gap in the transition layer, and inconsistency between a resonance frequency at a high temperature and a resonance frequency at a low temperature.

With reference to the first aspect, in an implementation of the first aspect, the top of the dielectric is connected to or isolated from (in other words, not connected to) the bottom of the cover.

With reference to the first aspect, in an implementation of the first aspect, the transition layer is configured to connect the dielectric and the cover.

With reference to the first aspect, in an implementation of the first aspect, a first groove is provided at the bottom of the cover, the transition layer fills the first groove, and an outer diameter of the transition layer is greater than an outer diameter of the dielectric; and the top that is of the dielectric and that is near an inner side wall and the bottom of the cover have a second overlapping area, and the dielectric overlaps the bottom of the cover in the second overlapping area, so that a second gap that accommodates the transition layer is formed between the top of the dielectric and the bottom of the cover.

In this embodiment of this application, a depth of the first groove is set to adjust the thickness of the transition layer, so that the transition layer has an appropriate thickness.

With reference to the first aspect, in an implementation of the first aspect, the transition layer includes a bottom transition sublayer and a top transition sublayer, the bottom transition sublayer is configured to connect the dielectric and the bottom of the filter cavity, and the top transition sublayer is configured to connect the dielectric and the cover.

With reference to the first aspect, in an implementation of the first aspect, a second step-shaped protrusion structure is disposed at the bottom of the cavity body, and the second step-shaped protrusion structure includes a third protrusion that is in contact with the bottom of the filter cavity and a fourth protrusion that is located on the third protrusion;

the bottom that is of the dielectric and that is near an inner side wall and the third protrusion have a third overlapping area, and the dielectric overlaps the third protrusion in the third overlapping area, so that a third gap is formed between the bottom of the dielectric and the bottom of the filter cavity;

the bottom transition sublayer fills the third gap;

a second groove is provided at the bottom of the cover, the top transition sublayer fills the second groove, and an outer diameter of the top transition sublayer is greater than an outer diameter of the dielectric; and the top that is of the dielectric and that is near the inner side wall and the bottom of the cover have a fourth overlapping area, and the dielectric overlaps the bottom of the cover in the fourth overlapping area, so that a fourth gap that accommodates the top transition sublayer is formed between the top of the dielectric and the bottom of the cover.

With reference to the first aspect, in an implementation of the first aspect, an outer diameter of the bottom transition sublayer is greater than the outer diameter of the dielectric; or an outer diameter of the bottom transition sublayer is less than the outer diameter of the dielectric, the second step-shaped protrusion structure further includes a fourth protrusion, the third protrusion is in contact with the bottom of the filter cavity through the fourth protrusion, and a height of the fourth protrusion is greater than or equal to ⅓ of a height of an inner side wall of the cavity.

Because a dielectric constant of a metal is considered to be infinitely large, the relatively high (a height is greater than or equal to ⅓ of the height of the inner side wall of the cavity) fourth protrusion is combined with a top dielectric pillar in this embodiment of this application, to obtain a dielectric pillar with an equivalent high dielectric constant (a higher dielectric constant of the dielectric pillar indicates a smaller size of the filter), to implement miniaturization of the filter in this embodiment of this application.

With reference to the first aspect, in an implementation of the first aspect, a bottom groove that points from an exterior of the filter cavity to an interior is provided at the bottom of the filter cavity.

With reference to the first aspect, in an implementation of the first aspect, a top groove that points from the exterior of the filter cavity to the interior is provided at the top of the cover.

In this embodiment of this application, the top groove is provided, so that the cover is relatively thinned, and the cover is capable of being deformed to a degree. The upper end face of the dielectric pillar may be seamlessly attached to the cover through an external force, so that a structure design of the transition layer (for example, a soldering tin layer) can be canceled on an end face that is of the dielectric and that is in contact with the cover. In this way, a process is simplified and costs are reduced.

In this embodiment of this application, the step-shaped protrusion structure is disposed at the bottom of the filter cavity, to resolve a problem of a CTE mismatch between the dielectric pillar and the filter cavity in a horizontal plane direction. In addition, the groove is provided at the bottom of the filter cavity to thin the bottom of the cavity, and the groove is provided at the top of the cover to thin the cover, to resolve a problem of a CTE mismatch between the dielectric pillar and each of the bottom of the filter cavity and the cover in a height direction (namely, a vertical direction).

With reference to the first aspect, in an implementation of the first aspect, a top protrusion is disposed at a middle position of the top of the cover; and the TM mode filter further includes a tuning rod, and the tuning rod penetrates into the confined space of the filter body through the top protrusion shown on the cover.

In this embodiment of this application, the top protrusion is disposed, so that the cover has a specific thickness, to meet a requirement of disposing the tuning rod.

According to a second aspect, a communications device is provided. The communications device includes the TM mode filter according to any one of the first aspect or the implementations of the first aspect.

According to a third aspect, a method for manufacturing a TM mode filter is provided. The TM mode filter includes: a filter body, including a filter cavity and a cover, and having hollow confined space; a dielectric, located in the hollow confined space; and a transition layer, configured to connect the dielectric and the filter body. A coefficient of thermal expansion CTE of the transition layer is between a CTE of the filter body and a CTE of the dielectric. The method includes:

disposing a preform of the transition layer in a gap between the filter body and the dielectric;

disposing the filter body in a first environment, so that the preform melts to connect the filter body and the dielectric, where a temperature of the first environment is higher than a melting point of the transition layer; and disposing the filter body in a second environment for cooling, to obtain the TM mode filter, where a temperature of the second environment is lower than the melting point of the transition layer.

In this implementation of this application, the transition layer is disposed, to resolve a problem of a CTE mismatch, and achieve good contact between the dielectric and the filter.

DESCRIPTION OF EMBODIMENTS

The following describes technical solutions of this application with reference to accompanying drawings.

Figure 1:
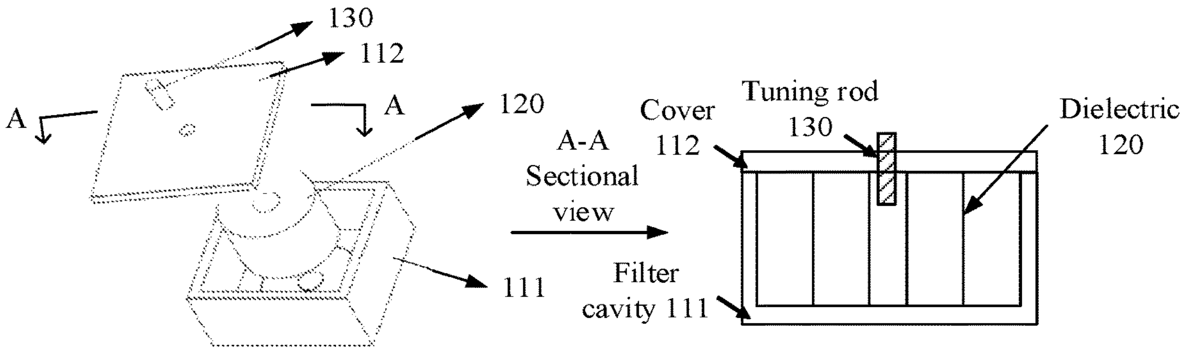
FIG. 1 (Prior Art)
FIG. 1 is a schematic structural diagram of an existing TM mode filter.

FIG. 1 shows an existing TM mode filter. The TM mode filter shown in FIG. 1 includes a filter cavity 111, a filter cover 112, and a dielectric resonator (dielectric for short) 120 located in confined space formed by the filter cavity 111 and the cover 112. Optionally, The TM mode filter may further include a tuning rod 130, and the tuning rod 130 penetrates into the confined space through the filter cover.

In the TM mode filter shown in FIG. 1, the dielectric is in contact with both the bottom of the filter cavity and the cover. In an existing solution, a coefficient of thermal expansion (coefficient of thermal expansion, CTE) mismatch occurs. Consequently, the dielectric shown in FIG. 1 cannot be in good contact with the cavity, and performance of the TM mode filter is affected.

In view of the foregoing problem, the embodiments of this application cleverly provide a TM mode filter. In the TM mode filter, a dielectric is connected to a filter body through a transition layer. Because a CTE of the transition layer is between a CTE of the filter body and a CTE of the dielectric in the embodiments of this application, a problem of a CTE mismatch can be resolved, and good contact between the dielectric and the filter can be achieved in the embodiments of this application.

Figure 2:
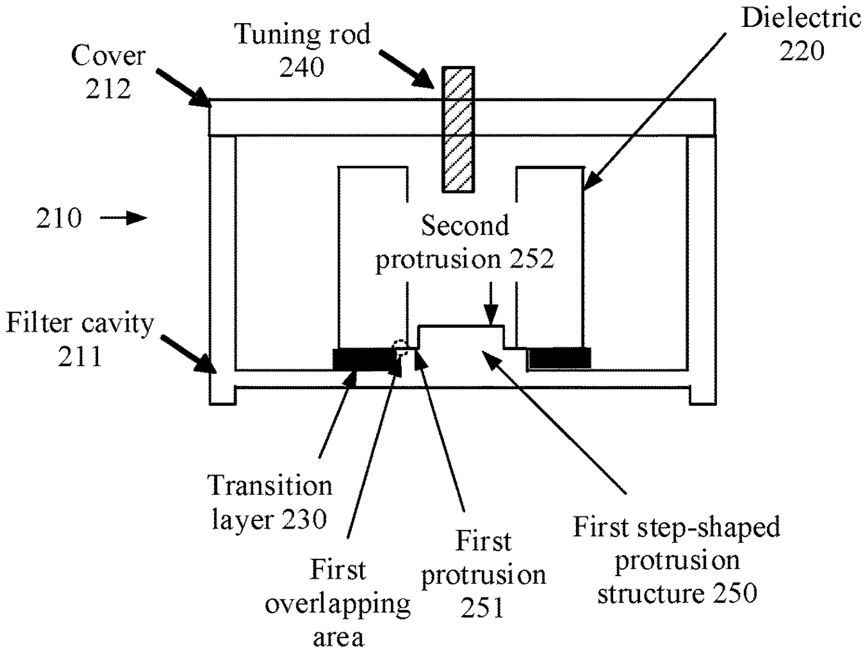
FIG. 2 is a schematic structural diagram of a TM mode filter according to an embodiment of this application.

By way of example and not limitation, a TM mode filter in the embodiments of this application is described in detail below with reference to FIG. 2 to FIG. 8. Specifically, as shown in FIG. 2, a transverse magnetic wave TM mode filter 200 in an embodiment of this application may include:

a filter body 210, including a filter cavity 211 and a cover 212, and having hollow confined space;

a dielectric 220 (which may also be referred to as a dielectric resonator), located in the hollow confined space; and a transition layer 230, configured to connect the dielectric and the filter body, where a coefficient of thermal expansion CTE of the transition layer is between a CTE of the filter body and a CTE of the dielectric.

Because the CTE of the transition layer is between the CTE of the filter body and the CTE of the dielectric, a problem of a CTE mismatch can be resolved, and good contact between the dielectric and the filter can be achieved in this embodiment of this application.

For example, a material of the dielectric in this embodiment of this application may be ceramic, and the coefficient of thermal expansion of the dielectric may be 7 ppm to 9 ppm. For example, a material of the cover or the cavity is an aluminum material, and a coefficient of thermal expansion of the cover or the cavity may be 27 ppm. In this case, the CTE of the transition layer in this embodiment of this application can be between the CTE of the dielectric and the CTE of the filter body, for example, is any value from 10 ppm to 26 ppm.

It should be understood that the transition layer in this embodiment of this application may also be referred to as a tie layer, a connection layer, a connection mechanism, or the like. This is not limited in this embodiment of this application.

Optionally, a material of the transition layer in this embodiment of this application may be a single metal or an alloy. For example, the transition layer is a soldering tin material (for example, SiAgCu or SiBiAg). A CTE of the soldering tin material is between that of a dielectric material and that of a die casting aluminum material, to balance a CTE mismatch between the dielectric material and the die casting aluminum material, and bind the dielectric material and the die casting aluminum material tightly.

It should be understood that soldering tin is a solder with a relatively low melting point, and is mainly solder made of a tin-based alloy. The soldering tin may be manufactured by making an ingot in a melting method, and then processing the material under pressure.

The soldering tin material in this embodiment of this application may be tin-lead alloy soldering tin, antimony-added soldering tin, cadmium-added soldering tin, silver-added soldering tin, copper-added soldering tin, or the like. This is not limited in this embodiment of this application.

It should be understood that the material of the transition layer in this embodiment of this application is not limited to the foregoing example, provided that the CTE of the transition layer is between the CTE of the filter body and the CTE of the dielectric. This is not limited in this embodiment of this application.

It should be understood that the filter body in this embodiment of this application may have a cuboid structure or a cube structure similar to that of the filter body shown in FIG. 1. Optionally, the filter body in this embodiment of this application may alternatively have a cylindrical structure. This is not limited in this embodiment of this application.

It should be understood that the dielectric in this embodiment of this application may also be referred to as a dielectric pillar. The dielectric in this embodiment of this application may have a cylindrical structure similar to that of the dielectric shown in FIG. 1. Optionally, the dielectric in this embodiment of this application may alternatively have another shape. This is not limited in this embodiment of this application. The transition layer in this embodiment of this application corresponds to a shape of the dielectric. An example in which the dielectric has a cylindrical structure and the corresponding transition layer has a cylindrical structure (which may also be referred to as an annulus structure) is used for description below.

It should be understood that an outer diameter of the dielectric below is a diameter of an outer circle of an annulus shape formed by a cross section of the cylindrical structure, and an inner diameter of the dielectric below is a diameter of an inner circle of the annulus shape formed by the cross section of the cylindrical structure. An outer diameter and an inner diameter of the transition layer are defined similarly.

Optionally, in another embodiment, as shown in FIG. 2, the TM mode filter in this embodiment of this application may further include a tuning rod 240. The tuning rod penetrates, through the cover 212, into the confined space formed by the filter body 210. The tuning rod may be a screw rod. A filtering frequency of the filter is tuned by adjusting a length by which the tuning rod 240 penetrates into the filter body 210.

Optionally, a first metal layer (not shown in the figure) is disposed on an end face that is of the dielectric and that is in contact with the transition layer, and the first metal layer is configured to connect the dielectric and the transition layer.

For example, the first metal layer is silver, copper, gold, or the like. This is not limited in this embodiment of this application.

In this embodiment of this application, the first metal layer is disposed on a dielectric ceramic pillar. For example, the dielectric is plated with the first metal layer through a sintering process. Because of the first metal layer, the dielectric and the transition layer can be securely and effectively welded together, to further securely and effectively connect the dielectric and the filter body.

It should be understood that, similar to that in FIG. 2, the first metal layer may be disposed on an end face that is of a dielectric and that is in contact with a transition layer in FIG. 3 to FIG. 8. Details are not described herein again.

Optionally, as shown in FIG. 2, the transition layer is configured to connect the dielectric and the bottom of the filter cavity.

Optionally, a first step-shaped protrusion structure 250 is disposed at the bottom of the cavity body, and the first step-shaped protrusion structure 250 includes a first protrusion 251 that is in contact with the bottom of the filter cavity and a second protrusion 252 that is located on the first protrusion 251;

the bottom that is of the dielectric and that is near an inner side wall and the first protrusion have a first overlapping area, and the dielectric overlaps the first protrusion in the first overlapping area, so that a first gap is formed between the bottom of the dielectric and the bottom of the filter cavity; and the transition layer fills the first gap, and an outer diameter of the transition layer is greater than an outer diameter of the dielectric.

Specifically, a height of the first gap may be equal to a thickness of the transition layer. For example, the height of the first gap is equal to 0.1 mm to 0.3 mm. In this embodiment of this application, the transition layer may completely fill the entire first gap. In other words, a space size of the first gap is equal to a size of the transition layer. Optionally, space occupied by the transition layer may alternatively be larger than space of the first gap. For example, when the transition layer completely occupies the entire first gap, the transition layer may further have a specific outer edge relative to an outer wall of the dielectric (in other words, the outer diameter of the transition layer is greater than the outer diameter of the dielectric).

It should be understood that if the transition layer (for example, the soldering tin material) is excessively thick, because of brittleness of the soldering tin material, a CTE mismatch between the dielectric and the filter cavity cannot be balanced. If the transition layer is excessively thin, it is easy to cause a case in which the transition layer cannot completely fill the first gap, and a bubble exists inside the first gap. Consequently, the transition layer is not smooth, and the outer edge of the transition layer has an air hole, affecting an insertion loss.

In this embodiment of this application, a height of the first protrusion is set to adjust a thickness of the transition layer, so that the transition layer has an appropriate thickness.

Optionally, in this embodiment of this application, the first overlapping area may alternatively be in an annulus shape, and a radius difference between an inner circle and an outer circle of an annulus of the first overlapping area is 0.1 mm to 0.3 mm.

In this embodiment of this application, an outer diameter of the second protrusion is less than an inner diameter of the dielectric. For example, the outer diameter of the second protrusion is 0.05 mm to 2 mm less than the inner diameter of the dielectric.

In this embodiment of this application, the outer diameter of the transition layer is greater than, for example, 1 mm to 2 mm greater than, the outer diameter of the dielectric.

In this embodiment of this application, the outer diameter of the transition layer is greater than the outer diameter of the dielectric, so that the transition layer is smoother, and it can be ensured that a loss of a current flowing through the transition layer is reduced. In addition, the outer diameter of the transition layer is slightly greater than the outer diameter of the dielectric, to ensure that the transition layer (which may also be referred to as a solder joint) can completely wrap an end face between the dielectric resonator and the cavity, thereby avoiding a capacitance effect introduced by a gap in the transition layer, and inconsistency between a resonance frequency at a high temperature and a resonance frequency at a low temperature.

Optionally, as shown in FIG. 2, the top of the dielectric is isolated from the bottom of the cover (in other words, the top of the dielectric is not in contact with the cover).

In this embodiment of this application, FIG. 2 shows only a case in which a lower end face of the dielectric is in contact with the filter body. This embodiment of this application is not limited thereto. During actual application, only one end face of the upper end face and the lower end face of the dielectric may be in contact with the filter body (in other words, the one end face is short-circuited with the filter body). Optionally, in this embodiment of this application, both the upper end face and the lower end face of the dielectric may be in contact with the filter body (in other words, the two end faces are short-circuited with the filter body). For details, refer to the following descriptions in FIG. 3 to FIG. 8.

Figure 3:
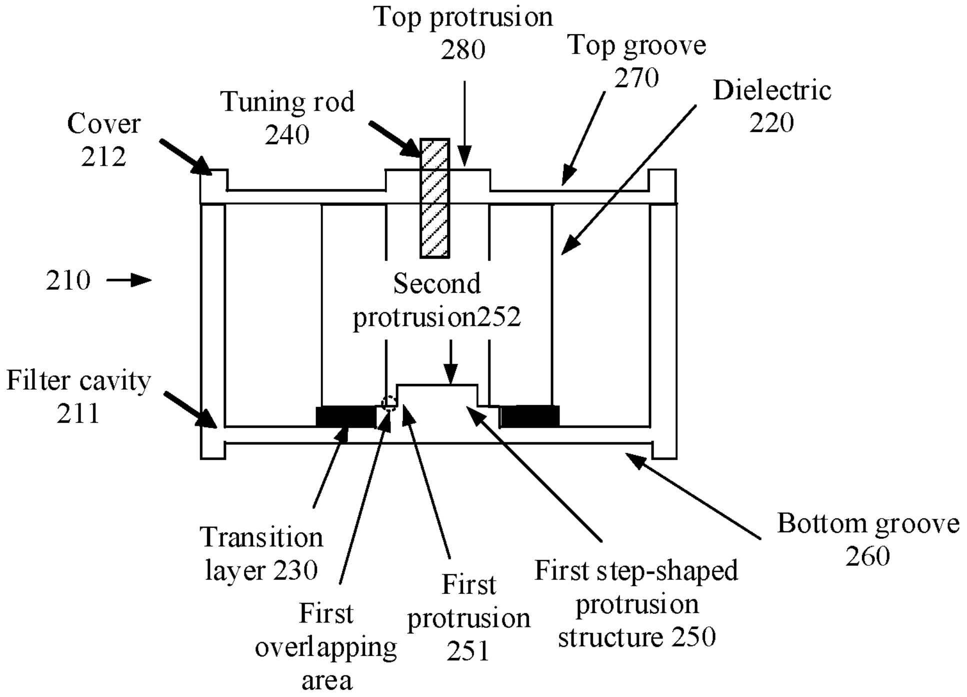
FIG. 3 is a schematic structural diagram of a TM mode filter according to another embodiment of this application.

For example, based on FIG. 2, the top of the dielectric may alternatively be in contact with the cover. For example, as shown in FIG. 3, the bottom of the dielectric 220 is adjacent to the filter cavity 211 through the transition layer 230, and the top of the dielectric 220 is connected to the bottom of the cover 212.

When both the upper end face and the lower end face of the dielectric are in contact (short-circuited) with the filter body, the TM mode filter works in a TM110 resonance mode.

When one end face of the dielectric is in contact with the filter body, for example, when the lower end face of the dielectric pillar is in contact (short-circuited) with the cavity, and the upper end face of the dielectric is open-circuited with the cover, or when the lower end face of the dielectric is open-circuited with the cavity, and the upper end face is short-circuited with the cover, the TM mode filter works in a TM116 resonance mode.

A filter in the TM110 resonance mode has characteristics of a low frequency and a small size, and performance of the filter is worse than performance of a filter in the TM116 resonance mode. Correspondingly, the filter in the TM116 resonance mode has characteristics of a larger size, a higher operating frequency, and better performance.

In this embodiment of this application, it may be determined, based on an actual situation, that one or both ends of the dielectric in the TM mode filter are in contact with the filter body. This is not limited in this embodiment of this application.

Further, in the TM mode filter shown in FIG. 3, a bottom groove 260 that points from an exterior of the filter cavity to an interior is provided at the bottom of the filter cavity.

Optionally, a top groove 270 that points from the exterior of the filter cavity to the interior is provided at the top of the cover.

Further, a top protrusion 280 is disposed at a middle position of the top of the cover, and the tuning rod 240 penetrates into the confined space of the filter body through the top protrusion 280 shown on the cover.

In this embodiment of this application, the top protrusion 280 is disposed, so that the cover has a specific thickness, to meet a requirement of disposing the tuning rod 240.

In this embodiment of this application, the top groove 270 is disposed, so that the cover is relatively thinned, and the cover is capable of being deformed to a degree. The upper end face of the dielectric pillar may be seamlessly attached to the cover through an external force, so that a structure design of the transition layer (for example, a soldering tin layer) can be canceled on an end face that is of the dielectric and that is in contact with the cover. In this way, a process is simplified and costs are reduced.

In this embodiment of this application, the step-shaped protrusion structure is disposed at the bottom of the filter cavity, to resolve a problem of a CTE mismatch between the dielectric pillar and the filter cavity in a horizontal plane direction. In addition, the groove 260 is provided at the bottom of the filter cavity to thin the bottom of the cavity, and the groove 270 is provided at the top of the cover to thin the cover, to resolve a problem of a CTE mismatch between the dielectric pillar and each of the bottom of the filter cavity and the cover in a height direction (namely, a vertical direction).

It should be understood that FIG. 2 shows a case in which the groove is provided at the bottom of the filter cavity. However, this embodiment of this application is not limited thereto. Optionally, during actual application, the groove may not be provided at the bottom of the filter cavity. Specifically, because neither an upper end nor a lower end of the dielectric in FIG. 2 is connected to the filter body, there is no mismatch problem in the vertical direction. Therefore, the end face at the bottom of the filter cavity may be set to be flat, to reduce processing complexity.

Figure 4:
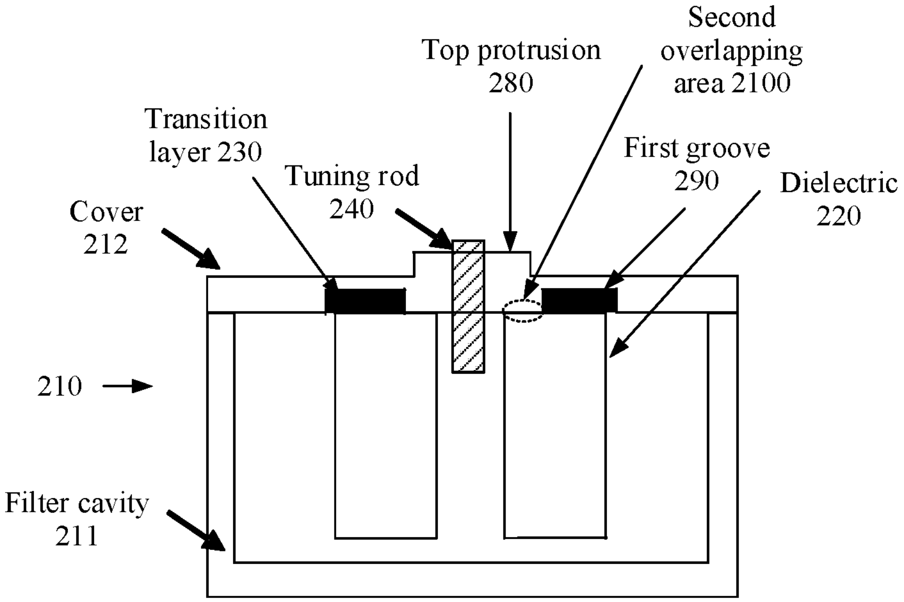
FIG. 4 is a schematic structural diagram of a TM mode filter according to another embodiment of this application.

An example in which the dielectric is connected to the filter cavity is described above with reference to FIG. 2, and an example in which the dielectric is in contact with the filter cavity and the cover is described with reference to FIG. 3. With reference to FIG. 4, an example in which the dielectric is connected to the cover but is not connected to the filter cavity is described below.

Specifically, a difference between the TM mode filter shown in FIG. 4 and that in FIG. 2 or FIG. 3 lies in that a first groove 290 is provided at the bottom of the cover of the TM mode filter in FIG. 4. The first groove 290 may be an annular groove, the transition layer 230 fills the first groove 290, and an outer diameter of the transition layer 230 is greater than an outer diameter of the dielectric 220.

The top that is of the dielectric and that is near an inner side wall and the bottom of the cover have a second overlapping area 2100, and the dielectric overlaps the bottom of the cover in the second overlapping area 2100, so that a second gap that accommodates the transition layer is formed between the top of the dielectric and the bottom of the cover.

Optionally, a depth of the first groove may be equal to a thickness of the transition layer. For example, the depth of the first groove may be 0.1 mm to 0.3 mm, and the second overlapping area is in an annulus shape. For example, a radius difference between an inner circle and an outer circle of an annulus in the second overlapping area is 0.5 mm to 1 mm.

In this embodiment of this application, the depth of the first groove 290 is set to adjust the thickness of the transition layer, so that the transition layer has an appropriate thickness.

It should be understood that, in an actual production process, the TM mode resonant filter shown in FIG. 4 may be inverted for production, and the transition layer fills the first groove under an action of gravity. This embodiment of this application is not limited thereto.

It may be understood that the first groove may not be disposed on the cover in FIG. 4, but may be replaced with a structure similar to the first step-shaped protrusion structure. It should be noted that in this case, a step-shaped protrusion structure disposed on the cover protrudes toward an interior of the filter cavity. In this case, for a size of the step-shaped protrusion structure on the cover, a relationship between the protrusion structure and the transition layer, and the like, refer to descriptions in FIG. 2. Details are not described herein again.

In FIG. 4, disposing the first groove 290 on the cover is easier than disposing the step-shaped protrusion structure at the bottom of the cover.

Optionally, FIG. 4 shows a case in which the top protrusion 280 is disposed at an upper part of the cover. The tuning rod 240 penetrates into the confined space of the filter body through the top protrusion 280 shown on the cover.

In this embodiment of this application, the top protrusion 280 is disposed, so that the cover has a specific thickness, to meet a requirement of disposing the tuning rod 240.

It should be understood that the top protrusion may not be disposed at the top of the cover in FIG. 4. In other words, the top of the cover in the figure may be of a planar structure. This is not limited in this embodiment of this application.

Figure 5:
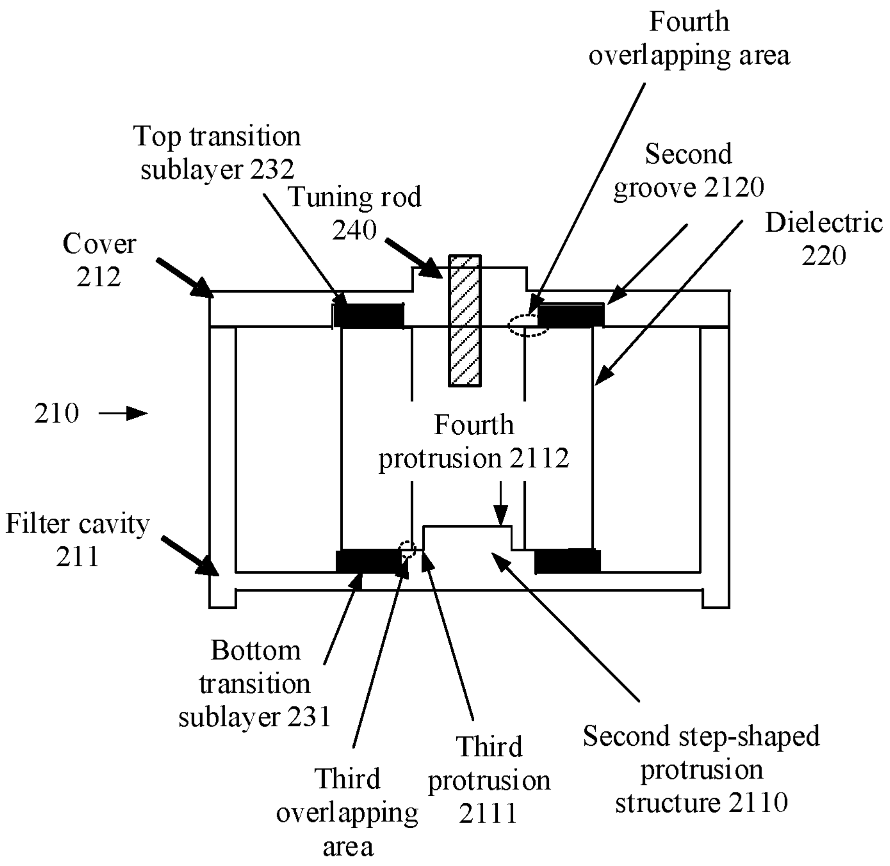
FIG. 5 is a schematic structural diagram of a TM mode filter according to another embodiment of this application.

FIG. 5 shows an example in which the dielectric in the TM mode filter is connected to the cover and is connected to the bottom of the filter cavity.

Specifically, as shown in FIG. 5, the transition layer 230 includes a bottom transition sublayer 231 and a top transition sublayer 232. The bottom transition sublayer 231 is configured to connect the dielectric 220 and the bottom of the filter cavity 211. The top transition sublayer 232 is configured to connect the dielectric and the cover 212.

Further, as shown in FIG. 5, a second step-shaped protrusion structure 2110 is disposed at the bottom of the cavity body, and the second step-shaped protrusion structure 2110 includes a third protrusion structure 2111 that is in contact with the bottom of the filter cavity and a fourth protrusion structure 2112 that is located on the third protrusion structure.

The bottom that is of the dielectric and that is near an inner side wall and the third protrusion have a third overlapping area, and the dielectric overlaps the third protrusion in the third overlapping area, so that a third gap is formed between the bottom of the dielectric and the bottom of the filter cavity.

The bottom transition sublayer 231 fills the third gap.

A second groove 2120 is provided at the bottom of the cover, the top transition sublayer 232 fills the second groove 2120, and an outer diameter of the top transition sublayer is greater than the outer diameter of the dielectric.

The top that is of the dielectric and that is near the inner side wall and the bottom of the cover have a fourth overlapping area, and the dielectric overlaps the bottom of the cover in the fourth overlapping area, so that a fourth gap that accommodates the top transition sublayer is formed between the top of the dielectric and the bottom of the cover.

An outer diameter of the bottom transition sublayer is greater than the outer diameter of the dielectric.

It should be understood that the second step-shaped protrusion structure 2110 in FIG. 5 is similar to the first step-shaped protrusion structure 250 in FIG. 2, and the bottom transition sublayer is similar to the transition layer in FIG. 2. The second groove 2120 in FIG. 5 is similar to the first groove 290 in FIG. 4, and the top transition sublayer is similar to the transition layer in FIG. 4. To avoid description, for a structural description in FIG. 5, refer to corresponding descriptions in FIG. 2 and FIG. 4. Details are not described herein again.

FIG. 5 shows a case in which the outer diameter of the bottom transition sublayer is greater than the outer diameter of the dielectric. However, this is not limited in this embodiment of this application. For example, the case in FIG. 5 may be changed to a case in FIG. 6. Specifically, a difference between FIG. 6 and FIG. 5 lies in that the outer diameter of the bottom transition sublayer is less than the outer diameter of the dielectric. In addition, in FIG. 6, the second step-shaped protrusion structure further includes a fourth protrusion 2113, the third protrusion is in contact with the bottom of the filter cavity through the fourth protrusion, and a height of the fourth protrusion is greater than or equal to ⅓ of a height of an inner side wall of the cavity.

Figure 6:
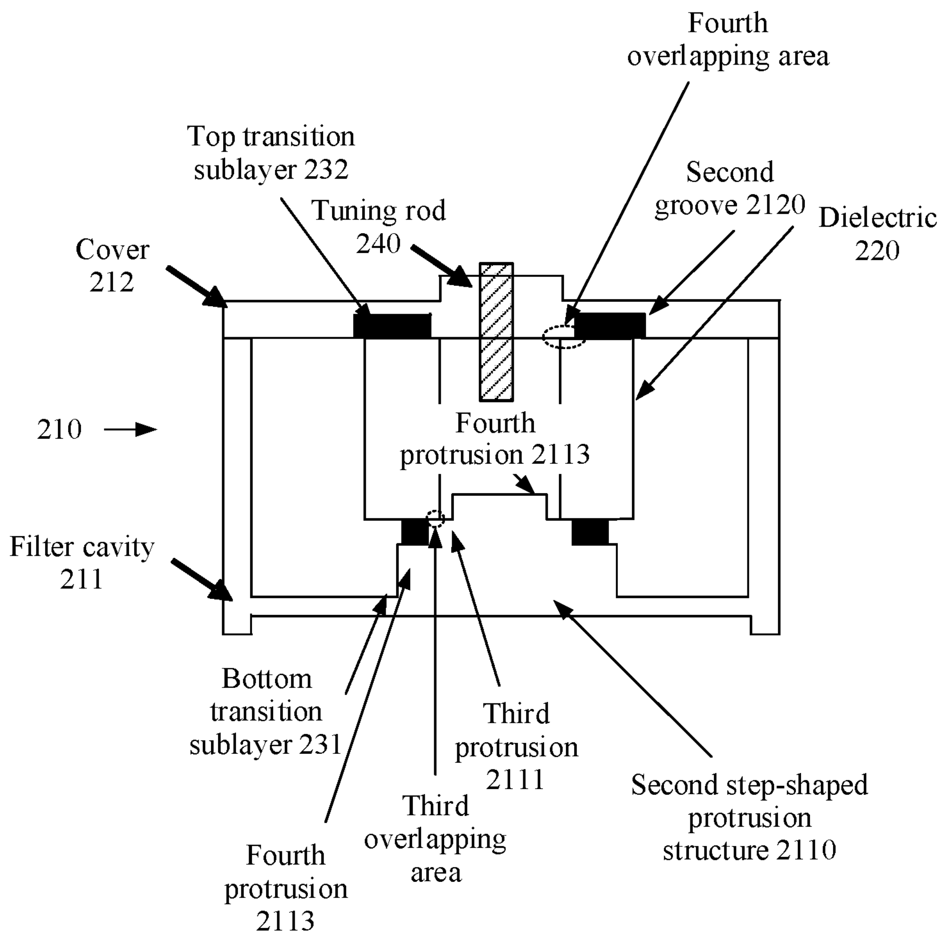
FIG. 6 is a schematic structural diagram of a TM mode filter according to another embodiment of this application.

Because a dielectric constant of a metal is considered to be infinitely large, the relatively high (a height is greater than or equal to ⅓ of the height of the inner side wall of the cavity) fourth protrusion is combined with a top dielectric pillar in FIG. 6, to obtain a dielectric pillar with an equivalent high dielectric constant (a higher dielectric constant of the dielectric pillar indicates a smaller size of the filter), to implement miniaturization of the filter in this embodiment of this application.

It should be understood that the TM mode filter in this embodiment of this application is not limited to the foregoing examples. In addition, a size of each structure in the filter in this embodiment of this application is not limited to the foregoing examples. A person skilled in the art may perform various variations based on the examples provided in this embodiment of this application, for example, may perform any combination or variation of the foregoing embodiments. Such modifications also fall within the protection scope of this embodiment of this application.

Figure 7:
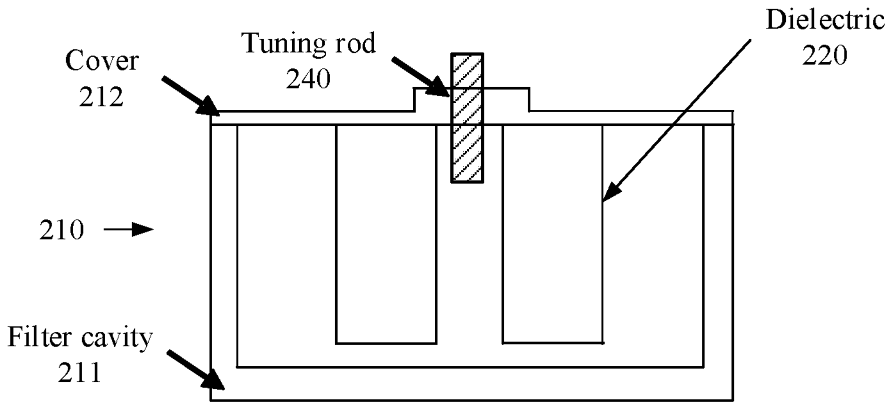
FIG. 7 is a schematic structural diagram of a TM mode filter according to another embodiment of this application.

For example, a form in FIG. 4 may be changed to a form in FIG. 7. For example, as shown in FIG. 7, the first groove 290 may not be provided on the basis of FIG. 4, but a relatively thin transition layer may be disposed. For example, the thickness of the transition layer may be less than 0.05 mm. This is not limited in this embodiment of this application.

Figure 8:
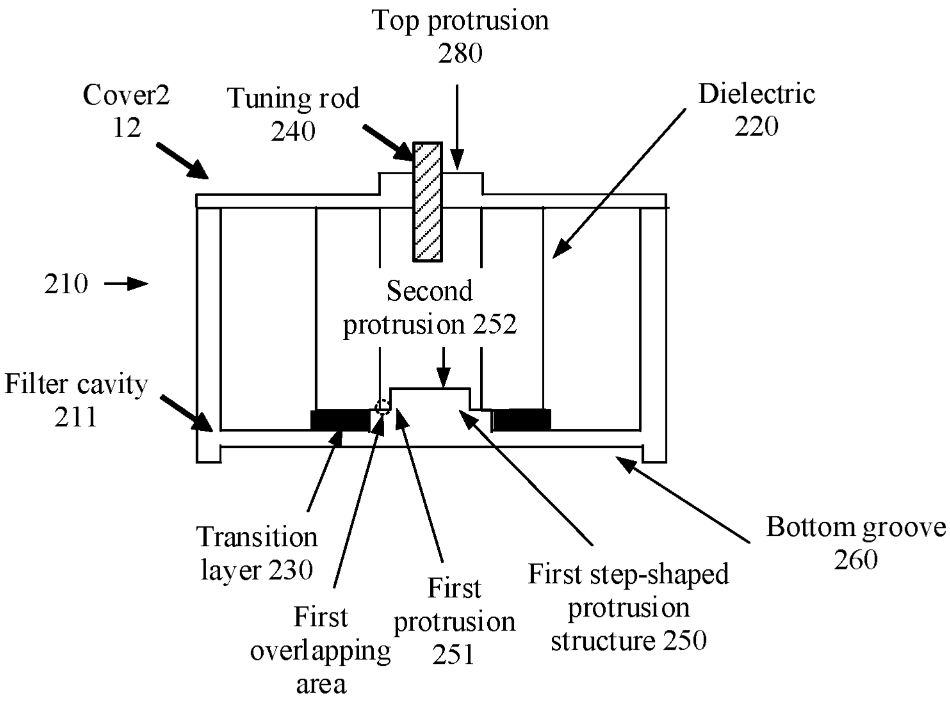
FIG. 8 is a schematic structural diagram of a TM mode filter according to another embodiment of this application.

For another example, a form in FIG. 3 may be changed to a form in FIG. 8. For example, as shown in FIG. 8, the top groove 270 may not be provided at the top of the cover, but a relatively thin cover may be disposed. For example, the thickness of the cover is 0.4 mm to 0.6 mm, and the top protrusion 280 is disposed on the cover. This is not limited in this embodiment of this application.

It should be understood that the values listed in the foregoing embodiments are merely examples. During actual application, sizes of structures in the embodiments of this application, for example, the thickness of the cover, the thickness of the transition layer, and a thickness of the bottom of the filter cavity, may be flexibly set, and may be specifically determined based on an actual requirement. This is not specifically limited in this embodiment of this application.

Figure 9:
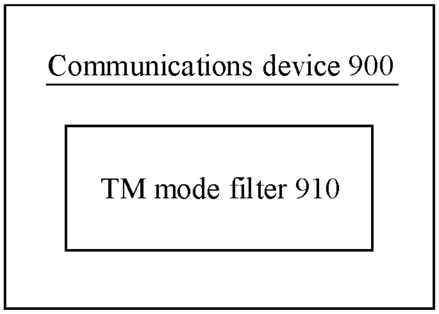
FIG. 9 is a schematic diagram of a communications device according to an embodiment of this application.

As shown in FIG. 9, an embodiment of this application further provides a communications device 900. The communications device 900 includes a TM mode filter 910. The TM mode filter 910 may be the TM mode filter described in any one of the embodiments in FIG. 2 to FIG. 8.

It should be understood that, in this embodiment of this application, the communications device may be a network device. The network device may be a base transceiver station (base transceiver station, BTS) in a global system for mobile communications (global system for mobile communications, GSM) system or code division multiple access (code division multiple access, CDMA), may be a NodeB (NodeB, NB) in a wideband code division multiple access (wideband code division multiple access, WCDMA) system, may be an evolved NodeB (evolved NodeB, eNB or eNodeB) in an LTE system, or may be a radio controller in a cloud radio access network (cloud radio access network, CRAN) scenario. Alternatively, the network device may be a relay station, an access point, a vehicle-mounted device, a wearable device, a network device in a future 5G network, a network device in a future evolved PLMN network, or the like, for example, a transmission point (TRP or TP) in an NR system, a gNB (gNB) in an NR system, one antenna panel or a group of antenna panels (including a plurality of antenna panels) of a base station in a 5G system. This is not particularly limited in this embodiment of this application.

An embodiment of this application further provides a method for manufacturing a TM mode filter. Specifically, the TM mode filter may be the TM mode filter described in any one of FIG. 2 to FIG. 8.

Figure 10:
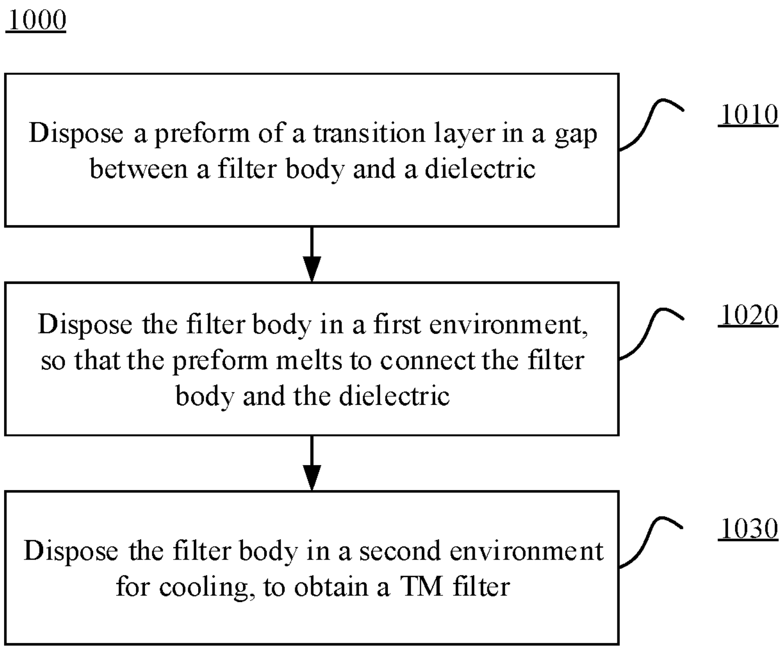
FIG. 10 is a schematic flowchart of a method for manufacturing a TM mode filter according to an embodiment of this application.

Specifically, as shown in FIG. 10, the method 1000 for manufacturing a TM mode filter includes the following steps.

1010: Dispose a preform of a transition layer in a gap between a filter body and a dielectric.

Specifically, the gap may be the first gap, the second gap, the third gap, or the like. This is not limited in this embodiment of this application.

1020: Dispose the filter body in a first environment, so that the preform melts to connect the filter body and the dielectric, where a temperature of the first environment is higher than a melting point of the transition layer.

1030: Dispose the filter body in a second environment for cooling, to obtain a TM mode filter, where a temperature of the second environment is lower than the melting point of the transition layer.

It should be understood that the temperature of the first environment and the temperature of the second environment may correspond to the dielectric, and may be flexibly adjusted based on different dielectrics. This is not specifically limited in this embodiment of this application.

It should be understood that the preform of the transition layer may alternatively be a solid-form member of the transition layer. The preform of the transition layer may be in a solid form. In the first environment, the preform melts and completely fills the gap formed by the filter body and the dielectric. Then, the preform is cooled in the second environment to form the transition layer, and the transition layer well connects the filter body and the dielectric.

In this implementation of this application, the transition layer is disposed, to resolve a problem of a CTE mismatch, and achieve good contact between the dielectric and the filter.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In this application, "at least one" means one or more, and "a plurality of" means two or more. The term "and/or" describes an association relationship for describing associated objects and represents that three relationships may exist. For example, A and/or B may represent the following three cases: "At least one of the following items" or a similar expression thereof refers to any combination of these items, including any combination of a single item or a plurality of items. For example, at least one of a, b, or c may represent a, b, c, a and b, a and c, b and c, or a, b, and c. Herein, a, b, and c may be singular or plural.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It should be further understood that "first", "second", "third", "fourth", and various numbers in this specification are merely used for differentiation for ease of description, and are not construed as a limitation on the scope of the embodiments of this application.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transverse magnetic wave (TM) mode filter, comprising:
- a filter body, the filter body comprising a filter cavity and a cover, and having hollow confined space, wherein a first step-shaped protrusion structure is disposed at the bottom of the filter cavity, and the first step-shaped protrusion structure comprises a first protrusion that is in contact with the bottom of the filter cavity and a second protrusion that is located on the first protrusion;
- a dielectric, the dielectric located in the hollow confined space; and
- a transition layer, the transition layer configured to connect the dielectric and the filter body, wherein a coefficient of thermal expansion (CTE) of the transition layer is between a CTE of the filter body and a CTE of the dielectric.

2. The TM mode filter according to claim 1, wherein a first metal layer is disposed on an end face of the dielectric, wherein the end face of the dielectric is in contact with the transition layer, and wherein the first metal layer is configured to connect the dielectric and the transition layer.

3. The TM mode filter according to claim 1, wherein the transition layer is configured to connect the dielectric and the bottom of the filter cavity.

4. The TM mode filter according to claim 3, wherein:
- a portion of the bottom of the dielectric and the first protrusion has a first overlapping area, the portion of the bottom of the dielectric is near an inner side wall, and the dielectric overlaps the first protrusion in the first overlapping area, wherein a first gap is formed between the bottom of the dielectric and the bottom of the filter cavity; and
- the transition layer fills the first gap, and an outer diameter of the transition layer is greater than an outer diameter of the dielectric.

5. The TM mode filter according to claim 4, wherein the top of the dielectric is connected to or isolated from the bottom of the cover.

6. The TM mode filter according to claim 1, wherein the transition layer is configured to connect the dielectric and the cover.

7. The TM mode filter according to claim 6, wherein:
- a first groove is provided at the bottom of the cover, the transition layer fills the first groove, and an outer diameter of the transition layer is greater than an outer diameter of the dielectric; and
- a portion of the top of the dielectric and the bottom of the cover has a second overlapping area, the portion of the top of the dielectric is near an inner side wall, and the dielectric overlaps the bottom of the cover in the second overlapping area, wherein a second gap that accommodates the transition layer is formed between the top of the dielectric and the bottom of the cover.

8. The TM mode filter according to claim 1, wherein the transition layer comprises a bottom transition sublayer and a top transition sublayer, wherein the bottom transition sublayer is configured to connect the dielectric and the bottom of the filter cavity, and wherein the top transition sublayer is configured to connect the dielectric and the cover.

9. The TM mode filter according to claim 8, wherein:
- a second step-shaped protrusion structure is disposed at the bottom of the filter cavity, and the second step-shaped protrusion structure comprises a third protrusion that is in contact with the bottom of the filter cavity and a fourth protrusion that is located on the third protrusion;
- a portion of the bottom of the dielectric and the third protrusion has a third overlapping area, the portion of the bottom of the dielectric is near an inner side wall, and the dielectric overlaps the third protrusion in the third overlapping area, wherein a third gap is formed between the bottom of the dielectric and the bottom of the filter cavity;
- the bottom transition sublayer fills the third gap;
- a second groove is provided at the bottom of the cover, the top transition sublayer fills the second groove, and an outer diameter of the top transition sublayer is greater than an outer diameter of the dielectric; and
- a portion of the top of the dielectric and the bottom of the cover has a fourth overlapping area, the portion of the top of the dielectric is near the inner side wall, and the dielectric overlaps the bottom of the cover in the fourth overlapping area, wherein a fourth gap that accommodates the top transition sublayer is formed between the top of the dielectric and the bottom of the cover.

10. The TM mode filter according to claim 9, wherein:
- an outer diameter of the bottom transition sublayer is greater than the outer diameter of the dielectric; or
- an outer diameter of the bottom transition sublayer is less than the outer diameter of the dielectric, the second step-shaped protrusion structure further comprises a fourth protrusion, the third protrusion is in contact with the bottom of the filter cavity through the fourth protrusion, and a height of the fourth protrusion is greater than or equal to ⅓ of a height of an inner side wall of the filter cavity.

11. The TM mode filter according to claim 1, wherein a bottom groove that points from an exterior of the filter cavity to an interior is provided at the bottom of the filter cavity.

12. The TM mode filter according to claim 1, wherein a top groove that points from the exterior of the filter cavity to the interior is provided at the top of the cover.

13. The TM mode filter according to claim 1, wherein a top protrusion is disposed at a middle position of the top of the cover, wherein the TM mode filter further comprises a tuning rod, and wherein the tuning rod penetrates into the confined space of the filter body through the top protrusion on the cover.

14. A communications device, comprising a transverse magnetic wave (TM) mode filter, wherein the TM mode filter comprises:
- a filter body, the filter body comprising a filter cavity and a cover, and having hollow confined space, wherein a first step-shaped protrusion structure is disposed at the bottom of the filter cavity, and the first step-shaped protrusion structure comprises a first protrusion that is in contact with the bottom of the filter cavity and a second protrusion that is located on the first protrusion;
- a dielectric, the dielectric located in the hollow confined space; and
- a transition layer, the transition layer configured to connect the dielectric and the filter body, wherein a coefficient of thermal expansion (CTE) of the transition layer is between a CTE of the filter body and a CTE of the dielectric.

15. The communications device according to claim 14, wherein a first metal layer is disposed on an end face of the dielectric, wherein the end face of the dielectric is in contact with the transition layer, and wherein the first metal layer is configured to connect the dielectric and the transition layer.

16. The communications device according to claim 14, wherein the transition layer is configured to connect the dielectric and the bottom of the filter cavity.

17. The communications device according to claim 16, wherein:

a portion of the bottom of the dielectric and the first protrusion has a first overlapping area, the portion of the bottom of the dielectric is near an inner side wall, and the dielectric overlaps the first protrusion in the first overlapping area, wherein a first gap is formed between the bottom of the dielectric and the bottom of the filter cavity; and the transition layer fills the first gap, and an outer diameter of the transition layer is greater than an outer diameter of the dielectric.

18. The communications device according to claim 17, wherein the top of the dielectric is connected to or isolated from the bottom of the cover.

19. The communications device according to claim 14, wherein the transition layer is configured to connect the dielectric and the cover.

20. A method for manufacturing a transverse magnetic wave (TM) mode filter, wherein the TM mode filter comprises a filter body, a dielectric, and a transition layer, the filter body comprising a filter cavity and a cover, and having hollow confined space, a first step-shaped protrusion structure disposed at the bottom of the filter cavity, the first step-shaped protrusion structure comprising a first protrusion that is in contact with the bottom of the filter cavity and a second protrusion that is located on the first protrusion, the dielectric located in the hollow confined space, the transition layer configured to connect the dielectric and the filter body, wherein a coefficient of thermal expansion (CTE) of the transition layer is between a CTE of the filter body and a CTE of the dielectric, and wherein the method comprises:

disposing a preform of the transition layer in a gap between the filter body and the dielectric;

disposing the filter body in a first environment, wherein the preform melts to connect the filter body and the dielectric, wherein a temperature of the first environment is higher than a melting point of the transition layer; and disposing the filter body in a second environment for cooling to obtain the TM mode filter, wherein a temperature of the second environment is lower than the melting point of the transition layer.

* * * * *